(12) United States Patent  
Chen

(10) Patent No.: US 6,206,710 B1  
(45) Date of Patent: Mar. 27, 2001

(54) CARD CONNECTOR

(75) Inventor: Ho-Jen Chen, Tu-Chen (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 09/459,953

(22) Filed: Dec. 13, 1999

(30) Foreign Application Priority Data

Nov. 23, 1999 (TW) ................................................ 88219917

(51) Int. Cl.$^7$ ................................................ H01R 13/62
(52) U.S. Cl. ........................................... 439/159; 439/630
(58) Field of Search .................................. 439/630, 545, 439/159; 200/524

(56) References Cited

U.S. PATENT DOCUMENTS

| | | | |
|---|---|---|---|
| 3,808,388 | * | 4/1974 | Neuschwander ............... 200/524 |
| 4,859,199 | * | 8/1989 | Komatsu ...................... 439/267 |
| 6,071,135 | * | 6/2000 | Obara ......................... 439/159 |

* cited by examiner

Primary Examiner—Renee Luebke  
(74) Attorney, Agent, or Firm—Wei Te Chung

(57) ABSTRACT

A card connector of the present invention comprises a housing, a card tray, a pair of sliders, a pair of springs, a plurality of electrical contacts and a shielding plate. The housing comprises a rear wall, a pair of resilient arms, and a base portion. The resilient arms each form a projection projecting inwardly at a front end thereof, the projections each defining an inclined surface thereon. The base portion includes a plurality of contact passageways, a plurality of first slots, a recess to slidably accommodate the sliders therein, a pair of grooves extending through a front end thereof into the recess, and a plurality of first restraining posts extending into the first slots to retain a spring at one end. The sliders each define a passage alignable with the groove of the base portion. The card tray defines a plurality of second slots therein and a plurality of second restraining posts associated with the second slots to retain the springs at the other end. The shielding plate defines a pair of openings adjacent to front ends of side portions thereof for permitting outward movements of front ends of the resilient arms to ease assembly of the card connector.

12 Claims, 4 Drawing Sheets

CARD CONNECTOR

BACKGROUND OF THE INVENTION

1. Field of the Invention

The present invention relates to a card connector, and particularly to a card connector having a mechanism for controlling the insertion and ejection of a card.

2. Description of the Prior Art

A card connector usually comprises a group of components and mechanisms for controlling the insertion and ejection of a card. The conventional mechanism of a card connector is directly fixed in the housing of the card connector and is prone to malfunction due to manufacturing (and/or forming) tolerance. In addition, the conventional mechanism requires high precision manufacturing, thereby resulting in assembly difficulties and increasing production costs. Furthermore, the connector using the conventional mechanism has a relatively high profile thereby taking up a relatively large amount of precious space in an electronic apparatus in violation of the trend forward thinner electronic components.

Therefore, a lower profile card connector which is more easily assembled is desired.

SUMMARY OF THE INVENTION

A main object of the present invention is to provide a card connector which reduces the height thereof thereby saving precious space in an electronic apparatus and which can be easily assembled thereby reducing production costs.

A card connector in accordance with the present invention comprises a dielectric housing, an insulative card tray, a pair of dielectric sliders, a shielding plate, a pair of springs, and a plurality of electrical contacts.

The housing is in a shape of a square plate and comprises a base portion, a rear wall, and a pair of opposite resilient arms extending forward from the rear wall. The base portion comprises a plurality of contact passageways, a recess, a pair of grooves extending through a front end thereof and in communication with the recess, a plurality of first restraining posts, and a plurality of first slots. The resilient arms each comprise a first ear adjacent to the rear end thereof and a projection at the opposite front end thereof, the projection defining an inclined surface at a front side thereof. The base portion forms a pair of short side walls extending upward at front ends of opposite longitudinal sides thereof, the tops of the side walls being flush with the tops of the front ends of the resilient arms adjacent thereto. Each side wall forms a second ear thereon. The first restraining posts each extend into one of the first slots to retain one end of one spring.

The sliders are accommodated in the recess of the base and each defines a guiding groove and a passage. The sliders are freely moveable side by side within the recess of the base portion.

The shielding plate defines a pair of openings at front ends of opposite side portions thereof for permitting outward movement of front ends of the resilient arms, aiding assembly of the card tray into the housing.

The card tray comprises a bottom wall and a pair of opposite side walls. The bottom wall comprises a plurality of first and second slits, a plurality of second slots, a plurality of second restraining posts, and a pair of guiding posts. The slits and the second slots are aligned with the contact passageways and the first slots of the base portion, respectively. The second restraining posts each extend into the second slots to retain the other end of the springs.

Other objects, advantages and novel features of the invention will become more apparent from the following detailed description of the present embodiment when taken in conjunction with the accompanying drawings.

DETAILED DESCRIPTION OF THE INVENTION

Figure 1:
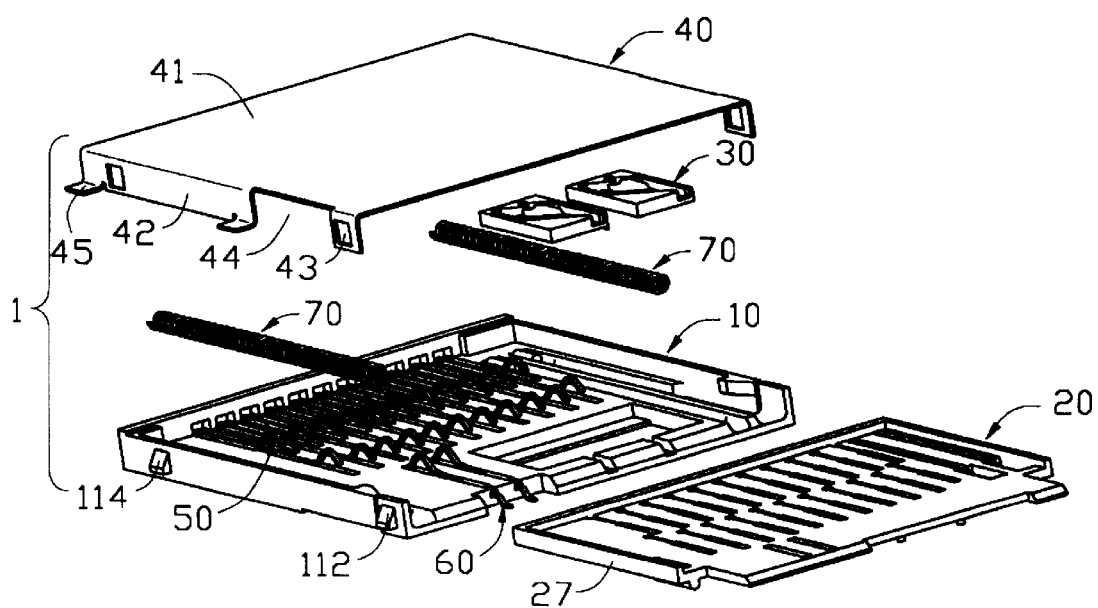
FIG. 1 is an exploded view of a card connector in accordance with the present invention.

Referring to FIG. 1, a card connector 1 in accordance with the present invention comprises a dielectric housing 10, an insulative card tray 20, a pair of dielectric sliders 30, a shielding plate 40, a plurality of first contacts 50, a pair of second contacts 60, and a pair of springs 70.

Figure 2:
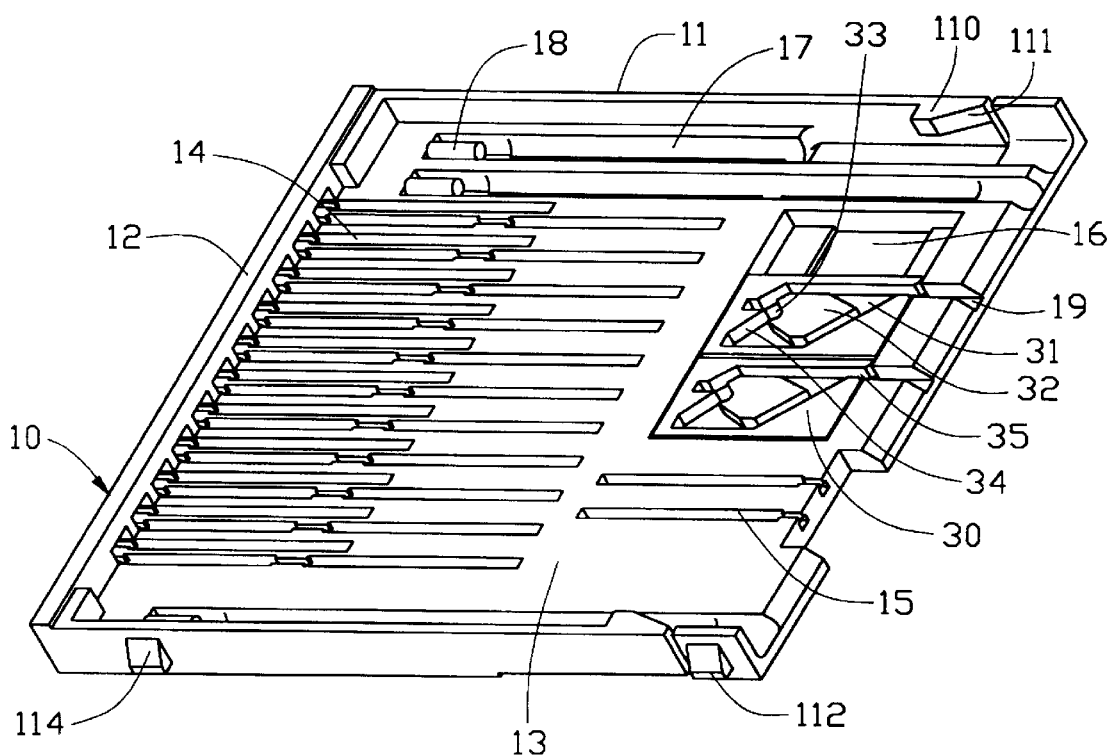
FIG. 2 is a perspective view of the housing of the connector of FIG. 1 with the sliders accommodated therein.
Figure 3:
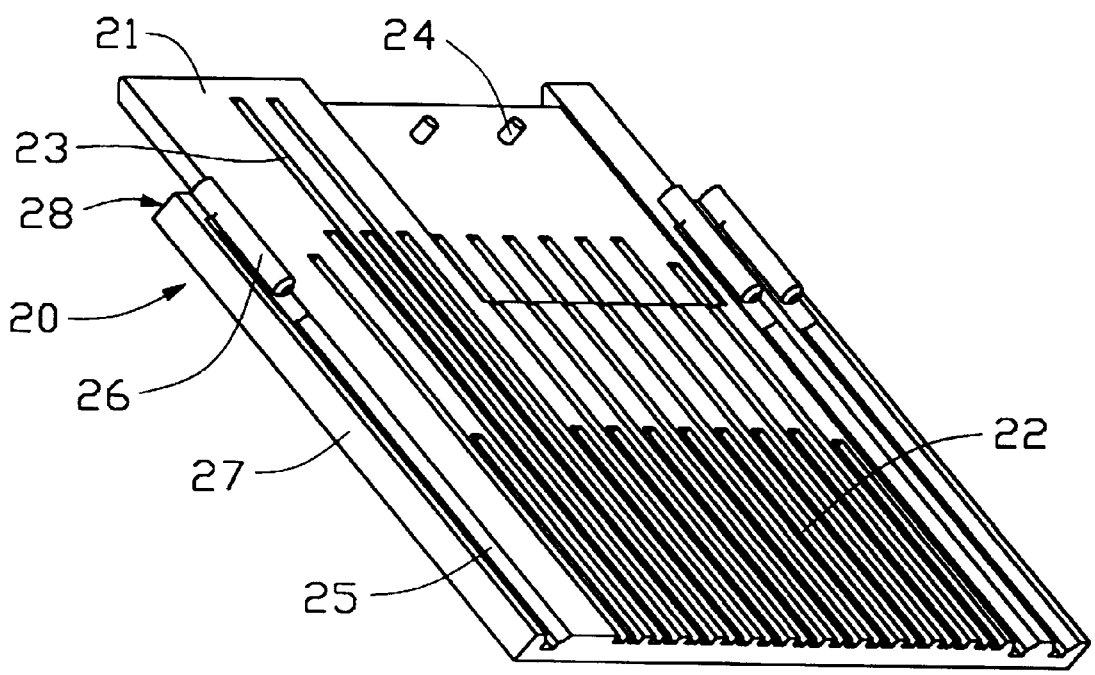
FIG. 3 is a perspective view of the card tray of the connector of FIG. 1.
Figure 4:
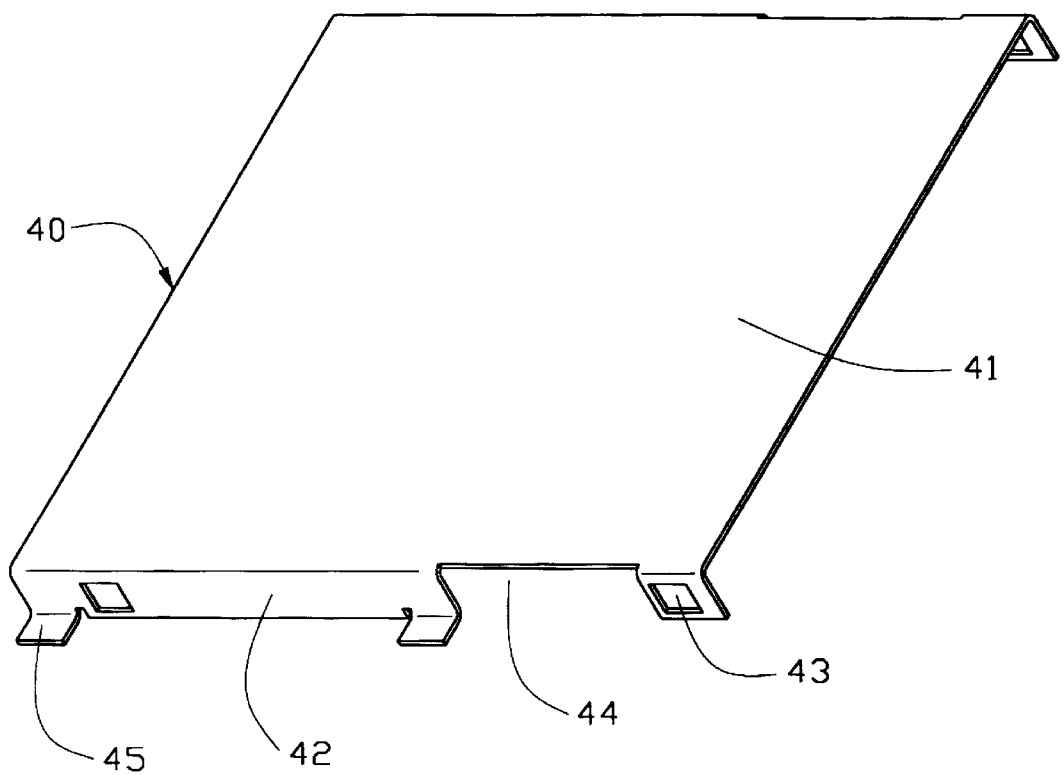
FIG. 4 is a perspective view of the shielding plate of the connector of FIG. 1.

Referring to FIGS. 2 to 4, the housing 10 comprises a rectangular base portion 13, a rear wall 12, and a pair of resilient arms 11 extending forward from the rear wall 12. The base portion 13 comprises a plurality of first contact passageways 14 at a center rear thereof, a pair of second contact passageways 15 and a recess 16 adjacent to a front end thereof, a plurality of first slots 17 adjacent to each opposite resilient arm 11, a plurality of first restraining posts 18 extending into the first slots 17, and a pair of grooves 19 extending from the recess 16 through the front end thereof. The opposite resilient arms 11 each form a first ear 114 adjacent to an outside rear end thereof and a projection 110 at an inside front end thereof. The projections 110 each define an inclined surface 111 at a forward side thereof. A pair of short side walls (not labeled) extends upward from the base portion 13 on both sides of a forward edge thereof, the side walls being of the same height as and flush with the resilient arms 11 adjacent thereto, and forming a pair of second ears 112 on an outside surface thereof.

The sliders 30 each comprise a guiding groove 31 defined around an island 32 and a passage 35 at a front end thereof. The guiding groove 31 includes a roughly circular track with a recessing position 33 and a cocked position 34 for controlling forward and rearward movement of the card tray 20 in the housing 10 in cooperation with the guide parts (not labeled) of the housing 10.

The card tray 20 comprises a pair of longitudinal side walls 27 and a bottom wall 21 between the opposite side walls 27. The bottom wall 21 defines a plurality of first slits 22 which extend to a rear end thereof, a pair of second slits 23 at a forward end thereof, and a plurality of second slots 25 adjacent to opposite side walls 27, and additionally forms a pair of guiding posts 24 at the forward end thereof. The second slots 25 each have a second restraining post 26 at a forward end thereof.

The shielding plate 40 comprises a main portion 41 and a pair of side portions 42 depending from opposite longitudinal sides of the main portion 41. The side portions 42 each comprises a pair of apertures 43, a pair of tabs 45 and an opening 44 between one tab 45 and one aperture 43.

In assembly, the first and second contacts 50, 60 are pressed into the first and second contact passageways 14, 15, respectively. The springs 70 are accommodated in corresponding first slots 17 and are retained at one end thereof by corresponding first restraining posts 18. The sliders 30 are received in the recess 16, the passages 35 being aligned with the grooves 19 of the base portion 13. The first and second ears 114, 112 of housing 10 engage with the apertures 43 of the side portions 42 of the shielding plate 40, forming a space (unlabelled) between the base portion 13 of the housing 10 and the main portion 41 of the shielding plate 40. The card tray 20 is then inserted into the space with the guidance of the inclined surfaces 111 of the projections 110. It is noted that the openings 44 of the shielding plate 40 allow the free ends, around the projections 110, of the resilient arms 11 to be deflected outwardly without interference thereof when the side walls 27 of the card tray 27 pass the corresponding resilient arms 11 in the insertion/assembling procedure. The second slots 25 are aligned with the first slots 17 to accommodate the springs 70 with the first slots 17 and the second restraining posts 26 retain the other end of the springs 70. The guiding posts 24 pass through the grooves 19 of the base portion 13 and the passages 35 of the sliders 30 into the guiding grooves 31 of the sliders 30.

In use, when a card (not shown) is inserted into the card connector 1 and pushed backward therein, the card tray 20 moves backward together with the card until the guiding posts 24 arrive at the recessing position 33 of the guiding grooves 31. During ejection of a card (not shown), the card is first pushed inward a short distance until the guiding posts 24 reach the cocked position 34 of the sliders 30, and is then released so that the card tray 20 and the card, under the force of the compressed springs 70, will move outward from the card connector 1, until the guiding posts 24 have forwardly traced a route from the cocked position 34 to the passage 35. At this point, the front ends 28 of opposite longitudinal side walls 27 of the card tray 20 are blocked by the projections 110 of the housing 10 while the card is ejected outward. It is noted that the springs 70 always urge the card tray 20 to move outwardly so as to retain the card tray 20 in either the inner position where the guiding posts 24 are in the recessing position 33 of the guiding grooves 31, or the outermost position where the card tray 20 is blocked by the projections 110. It also can be seen that during insertion/rejection of the card, the card tray 20 with the associated card therein is moved in a front-to-back longitudinal direction with regard to the housing 10, while the sliders 30 are associatively moved in a left-to-right lateral direction due to the guiding posts 24 of the card tray 20 being moved along/with the guiding groove 31 of the sliders 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A card connector comprising:
    a housing comprising a base portion, a rear wall, and a pair of resilient arms extending forward from the rear wall, the base portion comprising a plurality of contact passageways, a recess, and a groove extending from a front end of the housing into the recess;
    a plurality of contacts being received in the contact passageways;
    a slider being slidably received in the recess of the base portion and defining a guiding groove and a passage therein, the passage being alignable with the groove of the base portion;
    a shielding plate together with the base portion defining a space therebetween, an opening being defined at a front side portion of the shielding plate for permitting an outward movement of a front end of the resilient arm;
    a card tray being inserted into the space and comprising a bottom wall and a pair of opposite side walls, the bottom wall comprising a plurality of slits and a guiding post, the slits being aligned with the contact passageways, the guiding post being moveable with the card tray to trace along the guiding groove between a first position where the card tray is stopped by the resilient arms at a forward position and a second position where the card tray is stopped by the slider at a rearward position; and
    a pair of springs disposed between the housing and the card tray to urge the card tray toward the forward and the rearward positions.

2. The card connector as claimed in claim 1, wherein each resilient arm comprises a first ear adjacent to a rear end thereof and the base portion has a second ear at a front end thereof, and wherein the shielding plate defines a pair of apertures at each side portion thereof for receiving the first and the second ears.

3. The card connector as claimed in claim 1, wherein each resilient arm has a projection projecting inwardly at a front end thereof, the projection defining an inclined surface thereon for permitting entrance of the card tray into the space.

4. The card connector as claimed in claim 1, wherein the base portion comprises a plurality of first slots and a plurality of first restraining posts extending into the first slots, and the bottom wall comprises a plurality of second slots aligned with the first slots and a plurality of second restraining posts extending into the second slots.

5. The card connector as claimed in claim 4, wherein the first restraining posts are in line with corresponding second restraining posts.

6. The card connector as claimed in claim 5, wherein each of the first restraining posts retains one end of one spring and each of the second restraining posts retains the other end of the corresponding spring.

7. The card connector as claimed in claim 1 further comprising a second slider, and wherein the base portion has a second groove and the card tray has a second guiding post associated with the second slider.

8. The card connector as claimed in claim 7, wherein the two sliders are moveable with respect to each other and with respect to the recess of the base portion to adjustably accommodate two guiding posts.

9. A card connector comprising:
    a housing defining a base with a recess therein and with a pair of resilient arms extending on two sides thereof, each of said resilient arms defining a locking projection at a free end, a plurality of contacts extending upward above the base, at least a groove extending in a front-to-back direction in the housing and communicating the recess with an exterior;
    at least a slider laterally moveably received within the recess, said slider defining a loop shaped guiding groove which is communicatively aligned with the groove when said slider is in a specific lateral position;
    a shielding plate securely attached to and atop the housing and defining a space therebetween; and
    a card tray moveably received within the space and defining a bottom wall with two side walls, at least a guiding post extending downward from the bottom wall moveably received within the corresponding guiding groove; wherein said card tray is assembled to the housing, and is adapted to move back and forth with regard to the housing with an outermost position blocked by the locking projections of the resilient arms.

10. The connector as claimed in claim 9, wherein said shielding plate includes a pair of side portions with openings therein for allowing outward deflection of the free end of the resilient arms when said card tray is assembled into the space.

11. A card connector comprising:

a housing defining a base with a recess therein, a plurality of contacts extending upward above the base, at least a groove extending in a front-to-back direction in the housing and communicating the recess with an exterior;

at least a slider laterally moveably received within the recess, said slider defining a loop shaped guiding groove which is communicatively aligned with the groove when said slider is in a specific lateral position;

a shielding plate securely attached to and atop the housing and defining a space therebetween; and a card tray moveably received within the space and defining thereof a bottom wall with at least a guiding post extending downward from the bottom wall moveably received within the corresponding guiding groove; wherein said card tray is assembled to the housing in a front-to-back direction with the guiding post moving along the groove and then in the guiding groove, and is adapted to move back and forth with regard to the housing along the loop-like guiding groove.

12. A method of assembling a card connector, comprising the steps of:

providing an insulative housing with a base having a recess therein, a plurality of contacts extending upward above the base, at least a groove extending in a front-to-back direction in the housing and communicating the recess with an exterior;

downwardly disposing at least a slider into the recess, said slider being adapted to be laterally moveably received within the recess, and defining a loop shaped guiding groove which is communicatively aligned with the groove when said slider is in a specific lateral position;

attaching a shielding plate securely to and atop the housing, said shielding plate cooperating with the housing to define a space therebetween; and assembling a card tray into the space, said card tray defining a bottom wall with at least a guiding post extending downward from the bottom wall moveably received within the corresponding guiding groove; wherein said card tray is assembled to the housing in a front-to-back direction with the guiding post moving along the groove and then in the guiding groove, and is adapted to move back and forth with regard to the housing with the guiding post moving along the loop-like guiding groove.

* * * * *